(12) United States Patent
Pan et al.

(10) Patent No.: US 8,649,727 B2
(45) Date of Patent: Feb. 11, 2014

(54) PORTABLE KARAOKE SYSTEM, KARAOKE METHOD AND APPLICATION PROGRAM FOR THE SAME

(76) Inventors: Fu-Cheng Pan, Taipei (TW); Cheng-Tzong Lee, Taipei (TW)

(*) Notice: Subject to any disclaimer, the term of this patent is extended or adjusted under 35 U.S.C. 154(b) by 450 days.

(21) Appl. No.: 12/917,152

(22) Filed: Nov. 1, 2010

(65) Prior Publication Data
US 2012/0107785 A1 May 3, 2012

(51) Int. Cl.
*G09B 5/00* (2006.01)

(52) U.S. Cl.
USPC ..................................... 434/307 A

(58) Field of Classification Search
USPC ..................................... 434/307 A
See application file for complete search history.

(56) References Cited

U.S. PATENT DOCUMENTS

| | | | |
|---|---|---|---|
| 6,979,769 B1 * | 12/2005 | Majima et al. | 84/645 |
| 7,141,733 B2 * | 11/2006 | Fujishima et al. | 84/609 |
| 2007/0065794 A1 * | 3/2007 | Mangum | 434/307 A |

FOREIGN PATENT DOCUMENTS

| | | |
|---|---|---|
| KR | 1020070067025 A | 6/2007 |
| KR | 1020080006683 A | 1/2008 |
| KR | 1020090062724 A | 6/2009 |
| TW | M383885 | 7/2010 |

* cited by examiner

*Primary Examiner* — Kesha Frisby
(74) *Attorney, Agent, or Firm* — Chun-Ming Shih; HDLS IPR Services

(57) ABSTRACT

A portable karaoke system, a karaoke method and an application program for the same are disclosed. The karaoke system comprises a receiving end karaoke apparatus and at least a transmitting end karaoke apparatus. The receiving end karaoke apparatus generates a song list to provide to the transmitting end karaoke apparatus according to songs internally saved and songs uploaded from transmitting end karaoke apparatus. The transmitting end karaoke apparatus transmits a selection command to receiving end karaoke apparatus for generating a play queue according to the song list. The receiving end karaoke apparatus plays the song files saved internally for generating music signals according to a play queue sequence. Lastly, the transmitting end karaoke apparatus receives external vocal signals and transmits the external vocal signals to the receiving end karaoke apparatus to perform audio mixing with the music signals.

6 Claims, 5 Drawing Sheets

PORTABLE KARAOKE SYSTEM, KARAOKE METHOD AND APPLICATION PROGRAM FOR THE SAME

BACKGROUND OF THE INVENTION

1. Field of the Invention

The present invention relates to a karaoke system, in particular, the present invention relates to a portable karaoke system which is convenient to carry.

2. Description of Prior Art

As the music industry develop rapidly and the Music Video (MV) becomes popular, karaoke soon becomes well accepted form of entertainment to the general public.

Traditionally, people have to go to a room in a Karaoke Box to sing karaoke, make requests to select and play karaoke songs with a song request system in the room in the Karaoke Box, and sing along with the karaoke song with a microphone. Nonetheless, it is costly to rent a room in a Karaoke Box for singing Karaoke. In addition, a Karaoke Box is a public place where users share the same facilities in a closed space and sanitary issues may arise from time to time. Accordingly, many consumers dislike Karaoke given it is highly entertaining.

In order to meet the demands of the above consumers, family karaoke machines are introduced to the market. A family karaoke machine has large amount of song files saved internally. The family karaoke is connected to household television and speakers and provides at least a microphone to users. Thus, users can sing karaoke at home. A family karaoke machine is useful in offering the karaoke facility when users want to sing karaoke at home rather than in a Karaoke Box. Yet, a family karaoke machine is often too heavy and large to move freely to users. It is a pity that users do not move the karaoke machine elsewhere in the house after setting up the karaoke machine.

Accordingly, new portable karaoke machines are introduced, for example Taiwan Utility Model Patent No. M383885 disclosed a portable multimedia karaoke machine having an extended display, wherein components of the portable multimedia karaoke machine such as a display, an expansion device, a microphone and a microphone stool are disposed within a casing. The portable multimedia karaoke machine is installed with wheels and a pull rod so that uses can move the machine freely. The best advantage of the invention is the portable multimedia karaoke machine is easy to carry and move. With the portable multimedia karaoke machine, users can sing anywhere.

Nonetheless, the above portable karaoke machines are made by complex hardware components. In addition with license fee resulted from the large amount of sing files saved internally, the price of a karaoke machine is expensive. Moreover, such karaoke machines are designed for outdoor application and are too complex to be household equipment. The hardware components required in such a karaoke machine are common devices available in a normal household, for example, such hardware components can be televisions and speakers, and mobile devices (such as mobile phones and notebook computers) for playing song files self-produce or purchased online. Further, mobile phones have the function to receive audio signals and the microphone function. According to the above mentioned facts, it is a waste to users to purchase an expensive karaoke machine instead of effectively integrating available hardware components.

In view of this, it is desirable development to offer equipments performing karaoke function combined by general consumer devices and integrated expansions to consumers.

SUMMARY OF THE INVENTION

The objective of the present invention is to provide a portable karaoke system, a karaoke method and an application program so that users are allowed to play requesting songs and sing along with combining default hardware components of a mobile device, expansion devices and application program.

In order to achieve the above objective, the portable karaoke system of the present invention comprises a receiving end karaoke apparatus and at least a transmitting end karaoke apparatus. The receiving end karaoke apparatus generates a song list to provide to the transmitting end karaoke apparatus according to songs internally saved and songs uploaded from transmitting end karaoke apparatus. The transmitting end karaoke apparatus transmits a selection command to receiving end karaoke apparatus for generating a play queue according to the song list. The receiving end karaoke apparatus plays the song files saved internally for generating music signals according to a play queue sequence. Lastly, the transmitting end karaoke apparatus receives external vocal signals and transmits the external vocal signals to the receiving end karaoke apparatus to perform audio mixing with the music signals.

Compare to prior art, the advantages accomplished by the present invention are that a karaoke system which is complete and easy to carry is implemented by combining default components of a mobile device, additional expansion devices and an application program. Thus, users can save on the cost for purchasing a karaoke machine. In addition, a mobile device included in a karaoke system of the present invention by nature has advantages such as compact dimension, easy to carry and is a common device in daily life. Thus, a karaoke system based on a mobile device is more convenient and has great potential in becoming a popular utility to users.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
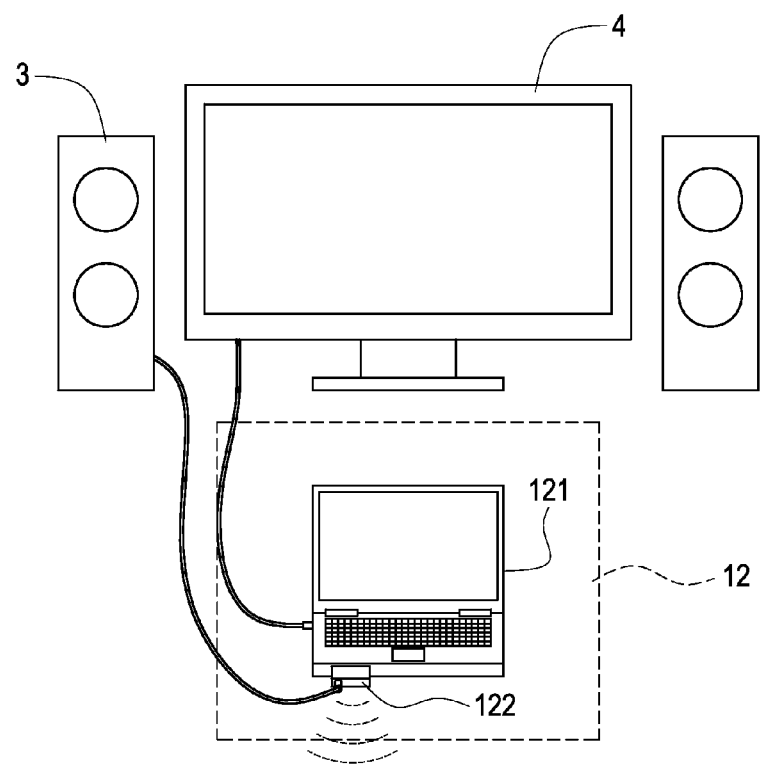
FIG. 1 is an architecture schematic diagram of a preferred embodiment according to the present invention.
Figure 1:
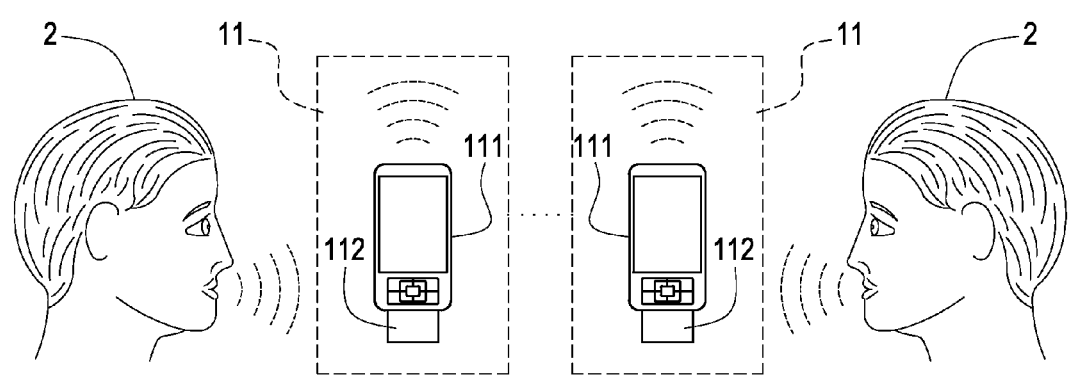

FIG. 1 is an architecture schematic diagram of a preferred embodiment according to the present invention.

The portable karaoke system 1 of the present invention comprises at least a transmitting end karaoke apparatus 11 and a receiving end karaoke apparatus 12. Each transmitting end karaoke apparatus 11 comprises a transmitting end mobile device 111 and a transmitting end expansion device 112. The receiving end karaoke apparatus 12 comprises a receiving end mobile device 121 and a receiving end expansion device 122. Nonetheless, the two expansion devices 112, 122 are used for expanding hardware functions of the two mobile devices 111, 121. In other embodiments, hardware components of the two expansion devices 112, 122 are integrated into the two mobile devices 111, 121.

The transmitting end mobile device 111 can be a smart mobile phone. The receiving end mobile device 121 can be a smart mobile phone, a Personal Digital Assistant (PDA), a tablet personal computer (for example an iPad) or a notebook computer and is not limited thereto.

In the present embodiment, vocals of a user 2 are received by the transmitting end mobile device 111, and transmitted to the receiving end karaoke apparatus 12 with the transmitting end expansion device 112 via Radio Frequency (RF) signal. A plurality of song files F1 are saved internally in the receiving end mobile device 121, and executed according to the song requesting sequence of the user 2 at the receiving end mobile device 121. The signals resulted from executing the song files F1 are transmitted to the receiving end expansion device 122. The receiving end expansion device 122 is connected to an external expansion device 3 which simultaneously receives the vocals of the user 2 and signals resulted from executing the song files F1 for performing audio mixing. The audio-mixed signals are outputted to the expansion device 3.

The receiving end mobile device 121 is connected to a external display 4 and simultaneously outputs image signals to the display 4 along with the audio-mixed signals such that users enjoy singing karaoke with the audio and video effect delivered.

Figure 2:
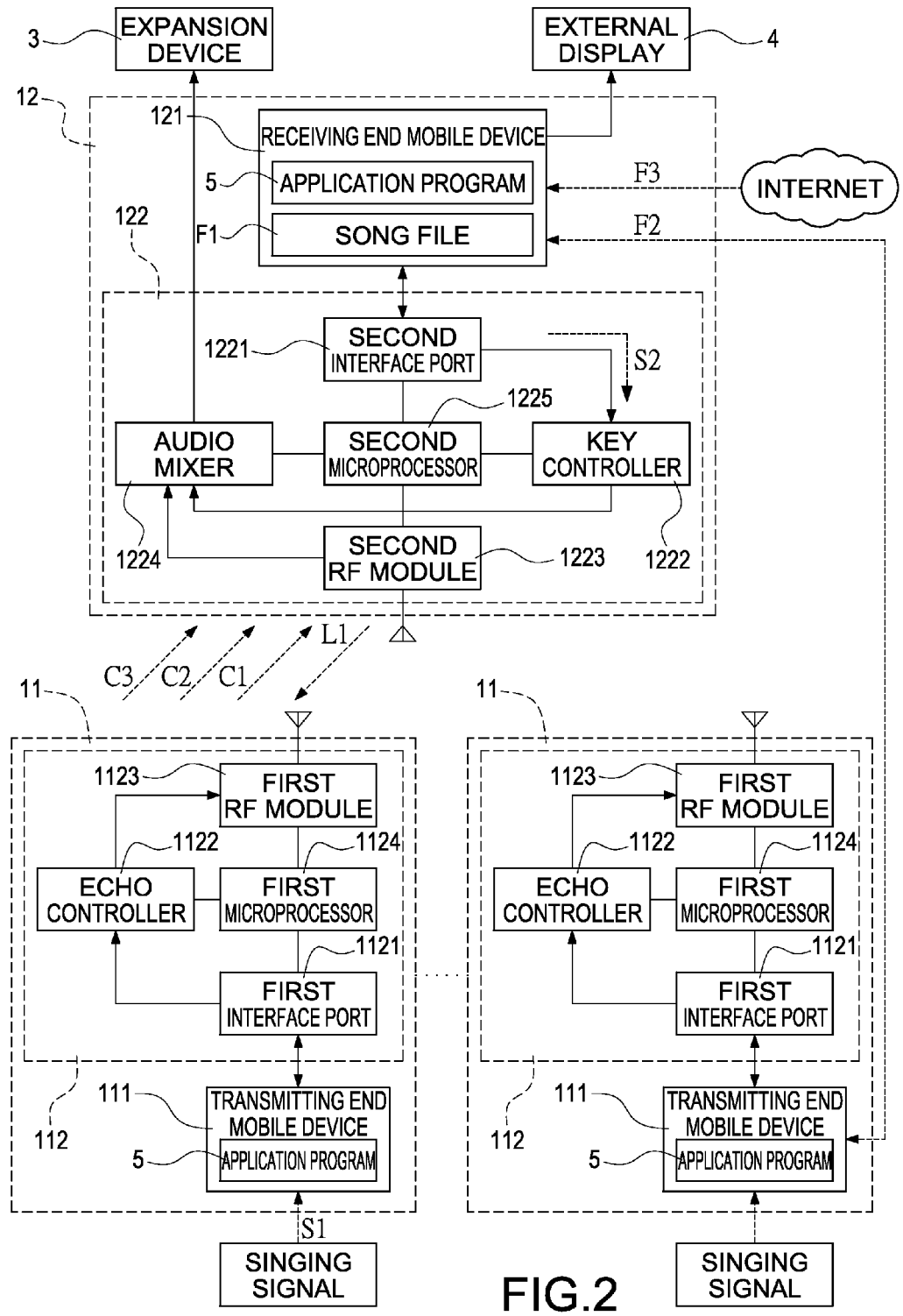
FIG. 2 is a block diagram of a preferred embodiment according to the present invention.

FIG. 2 is a block diagram of a preferred embodiment according to the present invention. An application program 5 is respectively installed in the two mobile devices 111, 121. The two mobile devices 111, 121 establish connection and execute a karaoke method of the present invention after the application program 5 is loaded and executed (detailed in the following).

The transmitting end expansion device 112 comprises a first interface port 1121, an echo controller 1122, a first RF module 1123 and a first microprocessor 1124.

The transmitting end expansion device is connected to the transmitting end mobile device 111 via the first interface port 1121 for receiving a vocal signal S1 from the transmitting end mobile device 111. The first interface port 1121 can be a Universal Serial Bus (USB) interface or a Bluetooth transmission interface, and is not limited thereto. The vocal signal S1 can be vocals of the user 2. In the present embodiment, the user 2 utilizes the transmitting end mobile device 111 as a microphone of the karaoke system 1.

The echo controller 1122 is electrically connected to the first interface port 1121 and receives the vocal signal S1 from the first interface port 1121 to perform echo processing.

The first RF module 1123 is electrically connected to the echo controller 1122 and receives the vocal signal S1 processed by the echo controller 1122 to transmit to the receiving end karaoke apparatus 12, more specifically, to transmit the vocal signal S1 to the receiving end expansion device 122.

The first microprocessor 1124 is electrically connected to the first interface port 1121, the echo controller 1122 and the first RF module 1123 and performs coordination and control on operations of the first interface port 1121, the echo controller 1122 and the first RF module 1123.

The receiving end expansion device 122 comprises a second interface port 1221, a key controller 1222, a second RF module 1223, an audio mixer 1224 and a second microprocessor 1225.

The receiving end mobile device 121 generates a music signal S2 after executing the song files F1. The receiving end expansion device 122 is connected to the receiving end mobile device 121 via the second interface port 1221 and receives the music signal S2 from the receiving end mobile device 121. The second interface port 1221 can be a USB interface or Bluetooth transmission interface, and is not limited thereto.

The key controller 1222 is electrically connected to the second interface port 1221, receives the music signal S2, and performs key tuning on the music signal S2.

The second RF module 1223 receives the vocal signal S1 transmitted from the transmitting end karaoke apparatus 11, more specifically, receives the vocal signal S1 transmitted from the transmitting end expansion device 112.

The audio mixer 1224 is electrically connected to the second RF module 1223 and the key controller 1222, and receives the vocal signal S1 transmitted from the transmitting end expansion device 112 and the key-tuned music signal S2. The vocal signal S1 and the music signal S2 are audio mixed then outputted to the expansion device 3.

The second microprocessor 1225 is electrically connected to the second interface 1221, the key controller 1222, the second interface port 1223 and the audio mixer 1224 and performs coordination and processing on operations of the second interface 1221, the key controller 1222, the second interface port 1223 and the audio mixer 1224.

Figure 3:
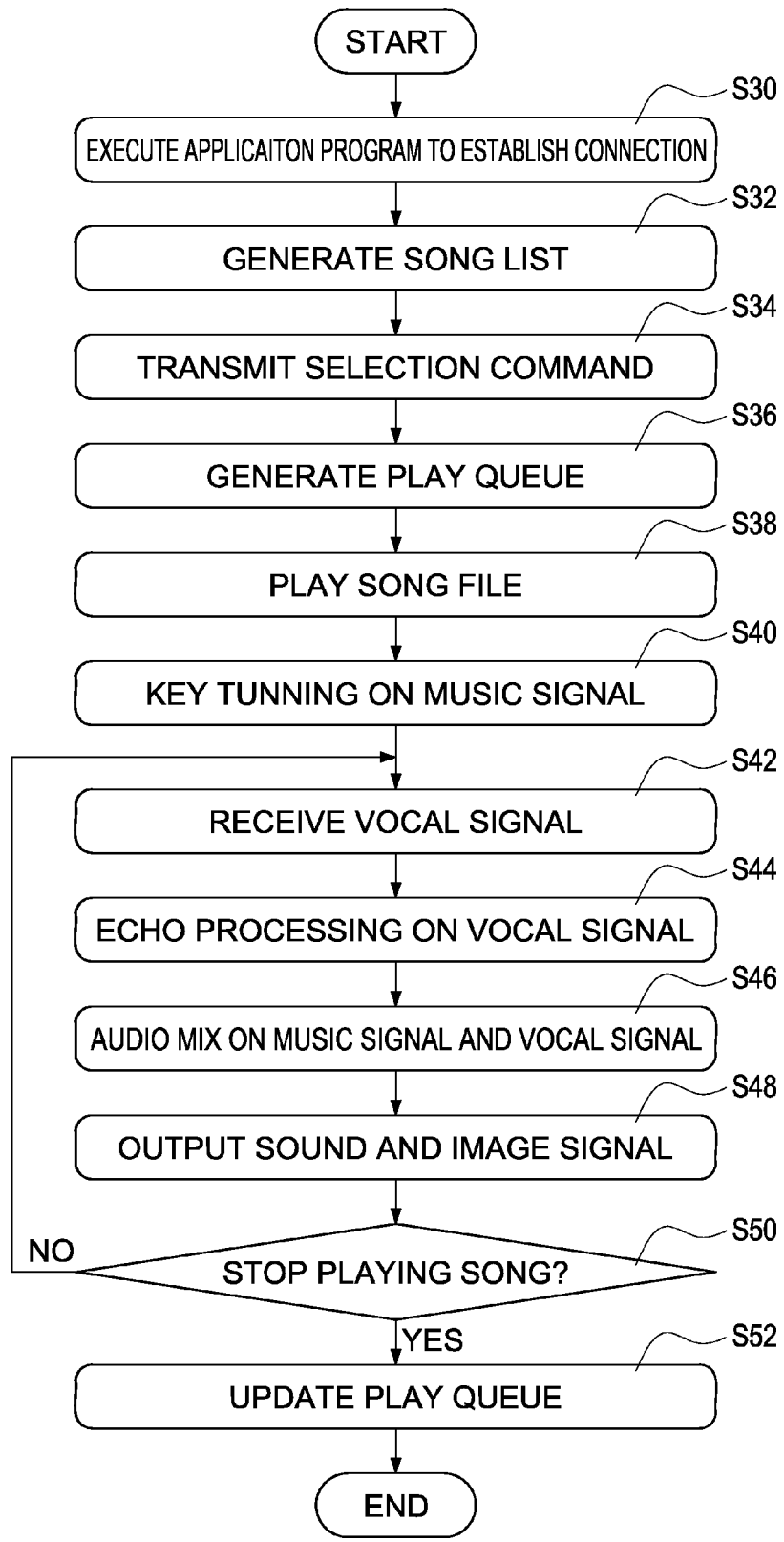
FIG. 3 is a flow chart of a preferred embodiment according to the present invention.

FIG. 3 is a flow chart of a preferred embodiment according to the present invention. First, the two mobile devices 111, 121 execute the application program 5 for establishing connection with each other (step S30). Next, the receiving end mobile device 121 generates a song list L1 according to the plurality of song files F1 via the application program 5 (as shown in FIG. 2) (step S32), and transmits the song list L1 to the transmitting end karaoke apparatus 11. The transmitting end mobile device 111 transmits a selection command C1 to the receiving end karaoke apparatus 12 according to the song list L1 via the application program 5 (as shown in FIG. 2) (step S34). The receiving end mobile device 121 generates a play queue according to the selection command C1 (queue) (step S36). In addition, the receiving end mobile device 121 plays the song files F1 in the receiving end mobile device 121 according to a sequence of the play queue (step S38). The receiving end mobile device 121 generates the music signal S2, then performs key tuning on the music signal S2 (step S40).

The user 2 make song requests of song files F1 via transmitting the selection command C1. The receiving end mobile device 122 generates a play sequence of the requested song files F1 according to a request sequence.

The transmitting end mobile device 111 receives the vocal signal S1 transmitted by the user 2 (step S42), and performs echo processing via the transmitting end expansion device 112 (step S44). Upon the echo processing is completed, the vocal signal S1 is transmitted to the receiving end karaoke apparatus 12. More specifically, the vocal signal S1 is transmitted to the receiving end expansion device 122.

The receiving end expansion device 122 simultaneously receives the music signal S2 and the vocal signal S1 for performing an operation of audio mixing (step S46). Lastly, audio mixed signals and corresponding image signals are output respectively (step S48). The image signals and the music signals S2 are outputted simultaneously which are the corresponding images and sounds of the song files F1 played.

Next, the receiving end mobile device 122 continues to determine if stop playing the song files F1 (step S50). If no, the step flow moves back to the step S42 and if yes, the play queue is updated (step S52). The play queue is a list of requested the song files F1 waiting to be played. Accordingly, as song playing of one of the song files F1 is completed, or a cut command C2 is received from the transmitting end karaoke apparatus 11 (as shown in FIG. 2), the song playing is stopped. Next, the name or identification code of the one song of the song files F1 is deleted from the play queue, the updated play queue then is transmitted to the transmitting end mobile device 111 to keep the user 2 informed of the status.

It should be noted that the song list L1 is generated from the corresponding song files F1 saved in the receiving end mobile device 122, the user 2 cannot request songs not listed in the song list L1.

Figure 4A:
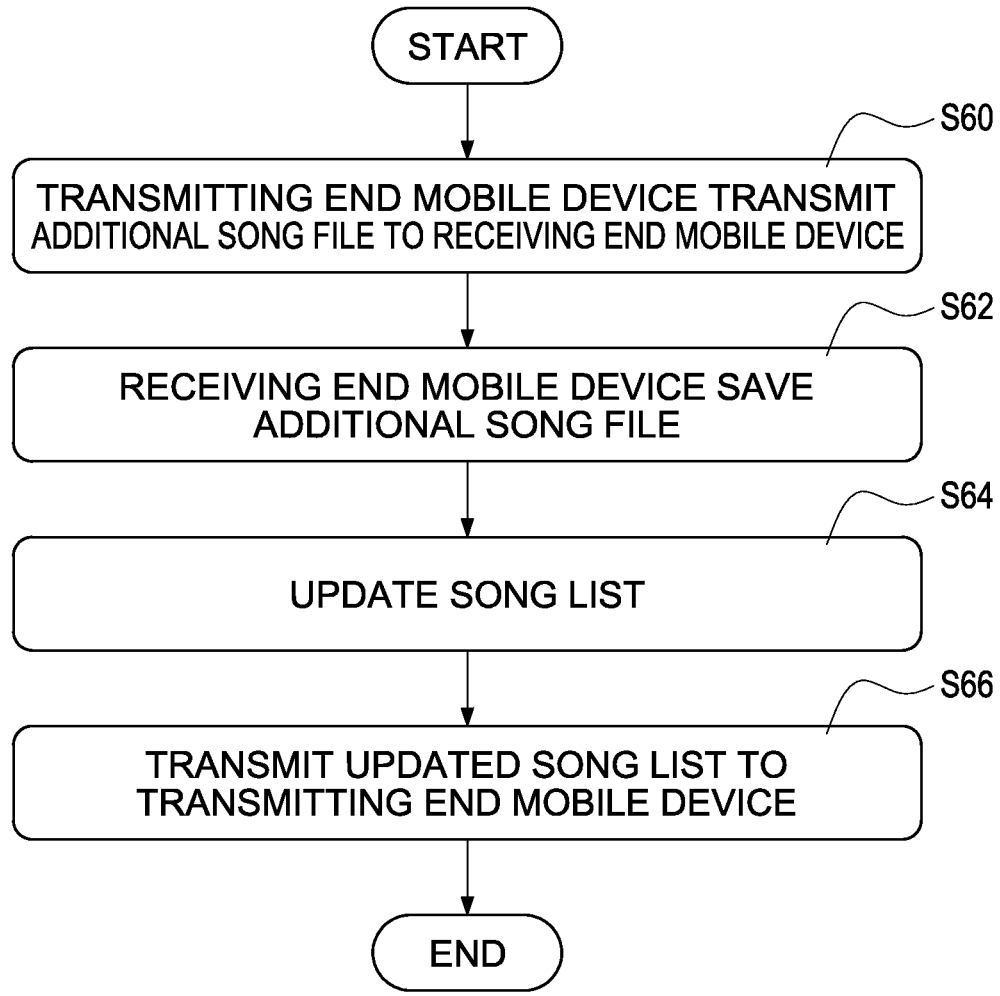
FIG. 4A is a song transmission flow chart of a preferred embodiment according to the present invention.
Figure 4B:
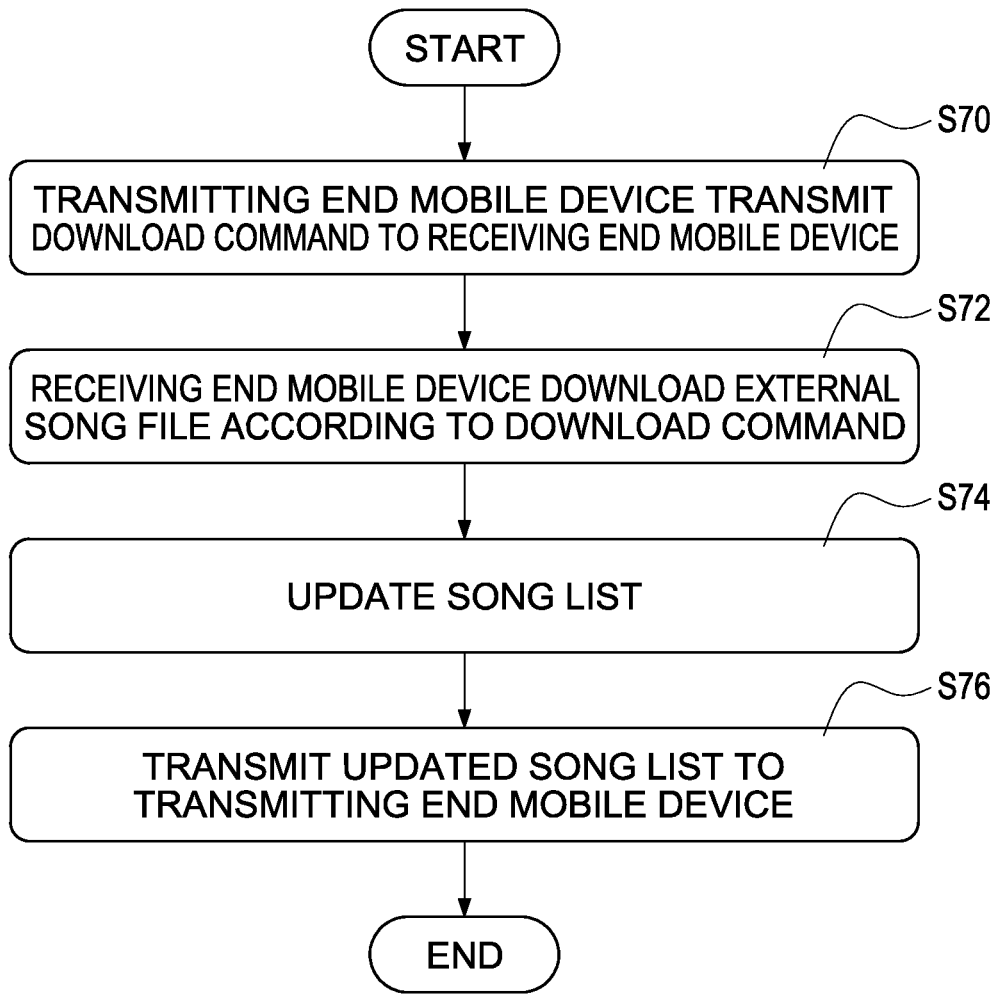
FIG. 4B is a download flow chart of a preferred embodiment according to the present invention ⊥ songs.

FIG. 4A and FIG. 4B are a song transmission flow and a chart download flow chart of a preferred embodiment according to the present invention. If the user 2 desires to request songs not listed in the song list L1, the transmitting end mobile device 111 transmits an additional song file F2 to the receiving end mobile device 121 (step S60). The receiving end mobile device 121 receives and saves the additional song file F2 (step S62). Further, the song list L1 is updated (step S64). Lastly, the updated song list L1 is transmitted back to the transmitting end mobile device 111 (step S66). Thus, the user 2 is allowed to request requesting the additional song file F2 saved in the transmitting end mobile device 111.

As shown in FIG. 4B, the user 2 transmits a download command C3 (as shown in FIG. 2) to the receiving end mobile device 121 via the application program 5 (step S70). The receiving end mobile device 121 connects to the Internet and downloads a corresponding external song file F3 according to the download command C3 (step S72). Next, the song list L1 is updated (step S74). Lastly, the updated song list L1 is transmitted back to the transmitting end mobile device 111 (step S76). Thus, the user 2 is allowed to request the external song files F3 which are not saved in the transmitting end mobile device 111 and the receiving end mobile device 121.

In the present invention, users sing karaoke via the plurality of transmitting end karaoke apparatuses 11 simultaneously. The plurality of the vocal signals S1 are simultaneously transmitted by the transmitting end expansion device 112 and the receiving end expansion device 122 via RF transmission.

Though, the selection command C1 shown in FIG. 2, the cut command C2 and the download command C3 are transmitted by the transmitting end expansion device 112 and the receiving end expansion device 122 via RF transmission depending on the field requirements. Or, the selection command C1 shown in FIG. 2, the cut command C2 and the download command C3 can also be directly transmitted by the transmitting end mobile device 111 and the receiving end mobile device 121 via Bluetooth transmission, and is not limited thereto.

Moreover, the vocal signals S2 are transmitted real-time to assure that the RF transmission bandwidth is not captured. When the transmitting end mobile device 111 desires to transmit the additional song files F2, the signal transmission is mainly accomplished via Bluetooth transmission.

As the skilled person will appreciate, various changes and modifications can be made to the described embodiments. It is intended to include all such variations, modifications and equivalents which fall within the scope of the invention, as defined in the accompanying claims.

What is claimed is:

1. A portable karaoke system comprising:
a smart mobile phone;
a transmitting end expansion device installed on the smart mobile phone to form a transmitting end karaoke apparatus, wherein the transmitting end expansion device includes a first interface port electrically connected to the smart mobile phone for receiving vocal signals transmitted by the smart mobile phone, an echo controller electrically connected to the first interface port for performing echo processing on the vocal signals, a first wireless module electrically connected to the echo controller for receiving echo-processed vocal signals from the echo controller, and a first microprocessor electrically connected to the first interface port, the echo controller and the first wireless module to perform coordination and control on the first interface port, the echo controller and the first wireless module for transmitting the echo-processed vocal signals via the first wireless module;
a mobile device having a plurality of song files saved therein; and
a receiving end expansion device installed on the mobile device to form a receiving end karaoke apparatus, wherein the receiving end expansion device includes a second interface port electrically connected to the mobile device for receiving music signals generated by the mobile device, a second wireless module for receiving the echo-processed vocal signals transmitted from the transmitting end expansion device, a key controller electrically connected to the second interface port for performing key tuning to the music signals, an audio mixer electrically connected to the second wireless module and the key controller for performing audio mixing on key-tuned music signals from the key controller and the echo-processed vocal signals from the second wireless module and outputting audio-mixed signals to an expansion device connected to the receiving end expansion device, and a second microprocessor electrically connected to the second interface port, the second wireless module, the key controller and the audio mixer to perform coordination and processing on the second interface port, the second wireless module, the key controller and the audio mixer.

2. The portable karaoke system of claim 1, wherein an application program is installed respectively in the smart mobile phone and the mobile device, the mobile device generates a song list according to the plurality of song files via the application program, the song list is provided to the transmitting end karaoke apparatus, the smart mobile phone transmits a selection command to the receiving end karaoke apparatus for generating a play queue according to the song list via the application program, and the mobile device plays the plurality of song files to generate the music signals according to a sequence of the play queue.

3. The portable karaoke system of claim 2, wherein the first wireless module is
a first radio frequency (RF) module electrically connected to the echo controller to receive the echo-processed vocal signals, and transmit the echo-processed vocal signals to the receiving end expansion device via RF signal.

4. The portable karaoke system of claim 3, wherein the second wireless module is
a second RF module to receive the echo-processed vocal signals transmitted from the transmitting end expansion device.

5. The portable karaoke system of claim 3, wherein the first interface port is a Universal Serial Bus (USB) interface or Bluetooth transmission interface, the selection command is transmitted to the receiving end karaoke apparatus via the transmitting end expansion device, or is transmitted directly from the smart mobile phone mobile device via the Bluetooth transmission.

6. The portable karaoke system of claim 4, wherein the second interface port is a USB interface or Bluetooth transmission interface, the song list is transmitted to the transmitting end karaoke apparatus via the receiving end expansion device, or is transmitted directly from the mobile device to the smart mobile phone via the Bluetooth transmission.

* * * * *